(12) United States Patent
Semmens

(10) Patent No.: US 6,833,188 B2
(45) Date of Patent: Dec. 21, 2004

(54) LIGHTWEIGHT CEMENTITIOUS COMPOSITE MATERIAL

(76) Inventor: Blaine K. Semmens, 14531 Lolly La. Apt. #24, Sonora, CA (US) 95370

( * ) Notice: Subject to any disclaimer, the term of this patent is extended or adjusted under 35 U.S.C. 154(b) by 309 days.

(21) Appl. No.: 10/098,953

(22) Filed: Mar. 15, 2002

(65) Prior Publication Data

US 2002/0129745 A1 Sep. 19, 2002

Related U.S. Application Data

(60) Provisional application No. 60/276,410, filed on Mar. 16, 2001.

(51) Int. Cl.$^7$ ............................................... D02G 3/00
(52) U.S. Cl. .................. 428/361; 428/327; 428/480; 428/496; 52/344; 52/408; 52/443; 52/449; 52/454
(58) Field of Search ................... 428/361, 327, 428/480, 496; 52/344, 408, 443, 449, 454

(56) References Cited

U.S. PATENT DOCUMENTS

| | | | |
|---|---|---|---|
| 3,272,765 A | 9/1966 | Sefton | 260/2.5 |
| 3,577,893 A | 5/1971 | Towner | 94/4 |
| 3,755,238 A | 8/1973 | Wiita | 260/29.6 XA |
| 3,763,614 A | * 10/1973 | Hyde et al. | 52/309.9 |
| 3,869,295 A | 3/1975 | Bowles et al. | 106/90 |
| 3,878,278 A | 4/1975 | Miller et al. | 364/45.3 |
| 3,899,455 A | 8/1975 | Unterstenhoefer et al. | 260/2.5 B |
| 3,902,911 A | 9/1975 | Messenger | 106/97 |
| 3,944,685 A | 3/1976 | Gunnerman | 427/223 |
| 3,960,580 A | 6/1976 | Stierli et al. | 106/58 |
| 3,963,849 A | * 6/1976 | Thompson | 428/182 |
| 3,991,252 A | 11/1976 | Kolakowski et al. | 428/313 |
| 4,019,297 A | 4/1977 | Murphy | 52/309.2 |
| 4,019,919 A | 4/1977 | DeSalvo | 106/90 |
| 4,040,855 A | 8/1977 | Rady-Pentek et al. | 106/90 |
| 4,057,526 A | 11/1977 | de Rook | 260/29.6 S |
| 4,066,463 A | 1/1978 | Chollet | 106/15 FP |
| 4,111,862 A | 9/1978 | Geschwender | 521/55 |
| 4,122,203 A | 10/1978 | Stahl | 428/309 |
| 4,137,198 A | 1/1979 | Sachs | 521/154 |
| 4,141,744 A | 2/1979 | Prior et al. | 106/105 |
| 4,159,302 A | 6/1979 | Greve et al. | 264/333 |
| 4,166,749 A | 9/1979 | Sterrett et al. | 106/93 |
| 4,185,066 A | 1/1980 | Temple | 264/257 |
| 4,211,738 A | 7/1980 | Genis | 264/44 |
| 4,245,054 A | 1/1981 | Hohwiller | 521/55 |
| 4,272,935 A | 6/1981 | Lukas et al. | 52/309.11 |
| 4,293,341 A | 10/1981 | Dudley et al. | 106/88 |
| 4,315,967 A | 2/1982 | Prior et al. | 428/285 |
| 4,318,361 A | 3/1982 | Sluys | 114/263 |
| 4,324,592 A | 4/1982 | Patel et al. | 106/85 |
| 4,339,362 A | * 7/1982 | Pascau | 524/5 |
| 4,340,510 A | 7/1982 | Howanietz et al. | 260/8 |
| 4,351,138 A | 9/1982 | McMillan et al. | 52/309.4 |
| 4,364,987 A | 12/1982 | Goodwin | 428/192 |
| 4,370,166 A | 1/1983 | Powers et al. | 106/97 |
| 4,425,440 A | 1/1984 | Bloembergen et al. | 521/54 |
| 4,591,385 A | 5/1986 | Pearsall | 106/38.3 |
| 4,698,366 A | 10/1987 | Laan | 521/55 |
| 4,749,413 A | 6/1988 | Tomic | 106/85 |
| 4,751,024 A | 6/1988 | Shu et al. | 252/601 |
| 4,756,762 A | 7/1988 | Weill et al. | 106/121 |
| 4,895,598 A | 1/1990 | Hedberg et al. | 106/86 |
| 4,992,481 A | 2/1991 | von Bonin et al. | 521/54 |
| 5,002,610 A | 3/1991 | Sherif et al. | 106/691 |
| 5,035,275 A | 7/1991 | Yamaguchi | 164/34 |
| 5,079,078 A | 1/1992 | Jutte, Jr. et al. | 428/251 |
| 5,124,365 A | 6/1992 | Rappold et al. | 521/57 |
| 5,137,927 A | 8/1992 | Wolff et al. | 521/54 |
| 5,352,390 A | 10/1994 | Hilton et al. | 252/601 |
| 5,401,538 A | 3/1995 | Perito | 427/403 |
| 5,472,498 A | 12/1995 | Stephenson et al. | 106/672 |
| 5,556,578 A | 9/1996 | Berneburg et al. | 252/604 |
| 5,558,707 A | 9/1996 | Bernt et al. | 106/677 |
| 5,580,409 A | 12/1996 | Andersen et al. | 156/210 |
| 5,601,919 A | * 2/1997 | Symons | 428/375 |
| 5,628,822 A | 5/1997 | Hogan | 106/802 |
| 5,641,584 A | 6/1997 | Andersen et al. | 428/703 |
| 5,736,594 A | 4/1998 | Boles et al. | 524/2 |
| 5,767,178 A | 6/1998 | Kokler et al. | 524/13 |
| 5,921,055 A | 7/1999 | Romes et al. | 52/742.13 |
| 6,200,381 B1 | 3/2001 | Rechichi | 106/801 |
| 6,387,504 B1 | * 5/2002 | Mushovic | 428/413 |

\* cited by examiner

Primary Examiner—Paul Marcantoni
(74) Attorney, Agent, or Firm—Gifford, Krass, Groh, Sprinkle, Anderson & Citkowski, P.C.

(57) ABSTRACT

A lightweight cementitious composite material includes expanded synthetic polymer particulate having a particle size of between 0.0625 and 0.5 inches. A dispersant coating on said particulate suppresses electrostatic attraction between particulate particles. A matrix surrounds the particulate and is present from 0.25 to 1 pound per gallon of dispersant coated particulate.

13 Claims, No Drawings

LIGHTWEIGHT CEMENTITIOUS COMPOSITE MATERIAL

RELATED APPLICATION

This application claims priority of U.S. Provisional Patent Application 60/276,410 filed Mar. 16, 2001 and is incorporated herein by reference.

FIELD OF THE INVENTION

The present invention relates to cementitious composites and, more particularly, to polymer particulate filled cementitious composites particularly well suited for roofing applications.

BACKGROUND OF THE INVENTION

The preparation of low density concrete incorporating lightweight hydrophilic aggregates such as vermiculite, cork, slag and the like in a hydrophobic matrix such as a cement mixture are well known. The density and longevity of a cementitious composite are improved through the incorporation of polymeric foam particles, for example, polystyrene foam, as the lightweight aggregate. However, cementitious material, being hydrophilic, has inadequate adhesion to lightweight polymeric aggregates which are hydrophobic while the use of a binding agent in the cement mixture or a pre-coat of the hydrophobic polymeric particles with a binding agent to promote adhesion therebetween has long been contemplated.

The prior art is replete with binding agents including bituminous products, coal tars, mixtures of pitch with polymeric resins, shellac, polyvinyl acetate and the like. Additional additives such as metal ions have been added to binding agents to lessen the tack of the coated particles and lessen coalescence between particles. Prior art lightweight cementitious composites containing hydrophobic polymeric particulate have been limited to certain limitations owing to pumpability problems, cost, environmental concerns regarding binder leachants therefrom, and particle aggregation during mixing and application. Additionally, drying time of prior art composites is sufficiently long that such composites are susceptible to overnight washout before set. Thus, there exists a need for a lightweight cementitious composite material that addresses many of these limitations.

SUMMARY OF THE INVENTION

A lightweight cementitious composite material includes expanded synthetic polymer particulate having a particle size of between 0.0625 and 0.5 inches. A dispersant coating on said particulate suppresses electrostatic attraction between particulate particles. A matrix surrounds the particulate and is present from 0.25 to 1 pound per gallon of dispersant coated particulate. A process of applying a composite material to a substrate comprises the steps of: forcing a stream of dispersant into fluid communication with a stream of expanded synthetic polymer particulate having a particle size between 0.0625 and 0.5 inches to form a dispersed particulate; propelling said dispersed particulate and a matrix slurry through a tube to form a foamed combined stream where the matrix is present from 0.25 to 1 pound of said matrix per gallon of said dispersed particulate; and applying said foamed combined stream to the substrate.

A process for preparing a lightweight structure includes passing an expanded synthetic polymer through a plurality of meshes to remove a fraction therefrom having dimensions of less than 0.0625 inches and greater than 0.5 inches to obtain an expanded synthetic polymer particulate. A dispersion is then mixed with the expanded synthetic polymer particulate to form a lightweight dispersal. The dispersal is combined with a matrix at a ratio of between 0.25 to 1 pound of the matrix per gallon of dispersal. After the dispersal and the binder are combined, sufficient time is allowed for the matrix to set.

DETAILED DESCRIPTION OF THE PREFERRED EMBODIMENTS

The present invention has utility in the formation of lightweight cementitious composite materials that contain recycled synthetic polymer particulate and are operative in construction settings. The present invention finds uses in roofing materials, structural coatings, and construction panel fabrication.

The present invention has been developed around the appreciation that different sized synthetic polymer particulate is productively used to form coatings and structures that meet handling and performance expectations for such structures.

An expanded synthetic polymer is formed to a particle size of between 0.0625 and 0.5 inches. Preferably, the synthetic polymer is obtained by grinding waste material. More preferably, the particle size is between 0.125 to 0.375 inches. A ground material is sieved to remove particle sizes outside of this particle range. It is appreciated that excessively large particles outside of the aforementioned particle size range are optionally returned to a regrind process. In an effort to utilize particles separated during the particle preparation process that are smaller than 0.0625 inches, these smaller particle can be used to add volume to an inventive reinforcement slurry. The invention is also developed around the fact that densities, compression strength, insulation values, and composition weights can be adjusted by regulating the particle size. For instance, steel decks for some structures may require a lightweight concrete to fill the spaces between the high portion of the deck sheets (flukes) and above highs to impart structural reinforcement. The required density may exceed that of the lighter large particle insulation formulation. It is possible to meet the structural requirements then change particle size and slurry ratios to achieve the R-value requirements and not exceed weight restrictions. Then an entirely different ratio of slurry to small particle size can be used to provide shear to the low density insulation material to give it the required surface compression strength. The synthetic polymer particulate operative herein is a hydrophobic expanded material illustratively including polystyrene, polyisocyanurate, polypropylene, polyethylene, other polyalkylenes and polyurethanes. Preferably, the synthetic polymer is polystyrene. As a result of synthetic polymer particulate grinding and sieving, electrostatic attractions develop therebetween.

A dispersant coating operative herein to suppress electrostatic attraction between synthetic polymer particulate particles includes a wide variety of materials. A dispersant coating substance operative herein illustratively includes slack lime; magnesium oxide; nonionic asphalt roof emulsion; cationic or anionic asphalt emulsions, such as a road emulsion; ionic styrene butadiene rubber emulsions; neoprene containing emulsions; and combinations thereof. It is preferred that an asphalt emulsion is modified with a like pH modifier, such as a rubber for use herein. Additionally, particulate dispersing coatings are also operative to suppress electrostatic attraction between synthetic polymer particulate. Powder type dispersing coatings operative herein illustratively include water insoluble carbonates, carboxylic acid salts, oxides and mixed oxides of metals from periodic table groups II, III and/or IV, and specifically include calcium carbonate, magnesium carbonate, barium carbonate, zinc carbonate, magnesium stearate, calcium palmitate, zinc stearate, aluminum stearate, zinc oxide, aluminum oxide, titanium dioxide, silicon dioxide, magnesium silicate, calcium silicate, aluminum silicate, and combinations thereof; insoluble hydroxides such as magnesium hydroxide, calcium hydroxide; magnesium phosphate, fumed silica, type F fly ash; type C fly ash; aluminum sulfate and other insoluble sulfates; and combinations thereof. Preferably, powder dispersing agent only lacks water to create a reactive dispersal. Organic polymeric dispersants operative herein illustratively include a copolymer of polyvinyl chloride with other authentically unsaturated monomers such as vinyl acetate or vinyl alcohol; acrylic resins; polyimides; epoxy resins and ionic detergents.

Owing to the comparative particulate size difference and lack of smaller synthetic polymer particulate amounting to dust, the amount of the comparatively expensive dispersant coating required herein is thereby diminished. Preferably, the dispersant coating is present from 0.125 to 0.75 pounds per gallon of synthetic polymer particulate. More preferably, the dispersant coating material is present from 0.125 to 0.50 pounds per gallon of synthetic polymer particulate.

A cementitious matrix material surrounds the dispersed particulate. The matrix material is present from 0.25 to 1 pound per gallon of dispersed particulate. Matrix materials operative herein are those conventional to the art. These illustratively include magnesium oxy-chloride/oxy-sulfate (Sorrel cement) cement, magnesium sulfa alumina cement, magnesium oxy-phosphate cement, silicate cement and polymer modified Portland cement. More preferably, the cementitious matrix material is present from 0.3 to 0.8 pounds of activated matrix material per gallon of dispersed particulate.

Preferably, magnesium oxy-chloride or magnesium oxy-sulfate cement is mixed with 10% by weight of the base matrix material of sulfa alumina cement in instances where rapid setting is desired. Dry silica or silicate, talc and combinations thereof from 0 up to about 10 weight percent of the base matrix material to form a cementitious matrix of exceptional strength compared to a base magnesium oxy-chloride or magnesium oxy-sulfate cement. A factory prefabricated sheet is operative herein to lessen washout of material associated with rain contacting cement with 12 hours of application. Preferably, the sheet material is a woven polyester mesh. A sheet material is treated on a first side with about 0.25 to 0.5 inches of a cementous matrix material. Preferably, the cementous matrix material is magnesium oxy-chloride cement. The second side of the sheet is coated with a water imperious material. Optionally, a fiber reinforcement additive is mixed with either the cementitious matrix or water impervious material. Preferably, the water impervious material is roof asphalt containing SBR latex rubber and clay. More preferably, the water impervious material is applied to the sheet material before the cementitious material. In usage, an inventive composite material is applied to a roof substrate. The composite material being comparatively rich in particulate, preferably, between 0.25 and 0.50 pounds of matrix material per gallon of particulate. The inventive composite is then wetted and overlayered by the cement coated first side of the sheet material that sets to the underlying inventive composite material. During the set, the sheet material being coated on the second side and interpenetrated by the water impervious material serves to protect the setting cementious matrix from washout.

The process of applying a dispersing coating to the expanded synthetic polymer particulate according to the present invention is appreciated to be largely dependent upon a form of the dispersant material used to form the dispersant coating. Regardless of the method by which a dispersant coating is applied, the particulate dispersal should be dried to form a free-flowing mass. Preferably, dispersal dehydration is coupled with tumbling to prevent particulate from agglomerating prior to addition of the matrix material. It is appreciated that heated air is operative to expedite drying time. Thus, for example, a basic sodium silicate or potassium silicate solution is applied at 0.25 pounds of sodium silicate solution per gallon of particulate is applied. The sodium silicate solution has a viscosity of less than three times the viscosity of water. Upon application of heated air, particulate so coated with a silicate solution is readily dehydrated and stored in a dehumidified environment for up to several months prior to usage. Optionally, a surfactant is included in the silicate solution in order to promote particulate wetability.

Upon forming a dry particulate dispersal, the preferred method of delivering the dispersal to for instance a roof is by way of a hose. Particulate dispersal is readily propelled by compressed or mechanically blown air. The particulate dispersal is optionally blown through a high hose in a dry condition when a fast setting matrix material is utilized in combination therewith. The particulate dispersal can then be mixed with fast setting matrix materials and an inline mixing tube such as that disclosed in U.S. Pat. No. 4,272,935. Such fast setting matrix materials are appreciated to be readily deliverable with airless pump by way of an appropriately sized hose relative to the particulate dispersal delivery hose. It is appreciated that a catalyst is optionally added to the matrix material mixture in a small mixing tube located upstream from the matrix material-particulate dispersal mixing tube by way of an additional line or inline reservoir with portion metering capabilities. The metering of the various components is adjusted such that the combined components are extruded immediately downstream from the mixing tube. An inventive composite material upon being blown onto a substrate is appreciated in most instances to require compaction in smoothing to form suitable. It is appreciated that a composite material prior to matrix material setting is also optionally poured into molds or otherwise formed into sheets and predetermined structures.

Optionally, a matrix material thickener is provided to adjust the viscosity thereof to facilitate ease of handling and application. Thickeners illustratively includes starch, cellulose, polyacrylate, and latex.

The present invention is further described with respect to certain non-limiting examples.

EXAMPLE 1

Expanded Polystyrene Particulate Dispersal Formation

A pH 10 or higher sodium silicate solution is combined with 3% by total volume of dibasic esters, the dibasic esters adipate, glutarate and succinate as sold by DuPont. Propylene carbonate is added thereto to a 3% total weight percent to function as a matrix material. 0.25 to 0.75 pounds of resulting solution is combined with a gallon of polystyrene particles having a particle size between 0.25 and 0.375 inches. Through high shear mixing to homogeneity, particulate dispersal is formed. This example is repeated to give a comparable product with like amounts of ethylene carbonate, monoacitin, diactin or triacitin substituted therefor. This formulation is particularly well suited in producing a prefabricated insulation board manufactured in a factory setting.

EXAMPLE 2

Roofing Fabric-foam Particulate Dispersal 0.4 pounds of pH adjusted SBR modified anionic asphalt is mixed with one gallon of expanded polyurethane particulate. The resulting fast setting asphalt emulsion is tumbled dry while mixing untreated ⅛ inch and smaller particulate and powder dispersing agents with care taken to avoid premature compaction thereof, and applied at room temperature and compacted to form a void fill for re-roofing applications. The SBR latex being present at 3 to 9 weight percent of said asphalt emulsion. The resulting preset composite material is spread smooth in a mound within an area using a wet trowel within an area that has been brushed, rolled, or sprayed with fast setting rubberized road emulsion. The mound is then compacted smooth to a consistent density and level in preparation for a reinforcement slurry applied thickly to one side of a polyester fabric. This material is readily applied at a 0.25 inch thick layer on the back of a polyester fabric and placed composite material side down onto a substrate. With the polyester fabric being cut to have approximately a six inch border there around absent composite material. Grooming of the polyester fabric. A water proofing or roof system is then optionally overlayered.

EXAMPLE 3

Precoated Roofing Sheet

A polyester fabric is precoated with a 0.0625 inch thick coat of cement containing the particulate dispersal of Example 1. A polyester fabric has a 10 wet mill coat of elastomeric roof coating or rubberized roof emulsion. The opposite side of this sheet is spray coated with a 10 wet mill layer of magnesium oxy-cement with no particulate dispersal. This portion of the process is done in a factory setting. After drying, this sheet can be rolled up for easy installment later. This sheet is used to reinforce the void fill or fill insulation system, resulting in pre dried layer ready for a roof system. This polyester fabric is then applied to a fresh layer of like magnesium oxy-cement on a roof substrate such that water runs off without washing away the cement prior to set.

EXAMPLE 4

Roofing Shingles

A magnesium oxy-chloride based cement is mixed with particulate dispersal per one gallon matrix material is applied per gallon of ⅛ inch and smaller particulate and is cast into an 8 foot by 22 inches mold tapering from a ⅛ inch top to ⅝ inch bottom and allowed to set. The set composite is reinforced with polyester fabric, using magnesium oxy-cement, or polymeric resin melt upon removal from the mold. The set composite material is cut to desired widths to form roofing shingles or siding panels. The resulting shingles or panels are suitable for coating and texturing in a factory setting to yield a finished product.

EXAMPLE 5

Insulation Panels

A magnesium oxy-chloride based cement is mixed with particulate dispersal per one gallon matrix material is applied per gallon of ⅛ inch and smaller particulate. The material is spray applied to an extruded polystyrene insulation panel. Spray of the composite material over insulation boards including seams serves to limit board thermal expansion associated with temperature change. The particulate is optionally compacted to densify the particulate.

EXAMPLE 6

Roof Insulation Board

The final mixture of Example 1 is extruded to form a 4 foot wide by 1 inch board and allowed to set. Then the resulting board is reinforced on the surface with a styrene melt to 20 mils.

All patents recited herein are indicative of the level of skill in the art. These patents are hereby incorporated by reference to the same extent as if each was specifically and individually incorporated by reference.

It is appreciated that one skilled in the art upon understanding the above detailed invention, that various changes and modifications are readily made thereto without departing from the scope of the invention as defined by the appended claims.

What is claimed is:

1. A structure produced from a composite material comprising:
   an expanded synthetic polymer particulate having a particle size between 0.0625 and 0.5 inches;
   a dispersant coating of polyvinyl alcohol on said particulate so as to suppress electrostatic attraction therein;
   a matrix material of magnesium oxy-chloride cement surrounding said particulate, said matrix material is present from 0.25 to 1 pound per gallon of said particulate.

2. The structure of claim 1 further comprising a sheet material adjacent to the composition.

3. The structure of claim 2 wherein said sheet material is polyester.

4. The structure of claim 2 wherein said sheet material has a first side pre-impregnated with a dry cementious matrix material and a second side pre-impregnated with water impervious material.

5. The structure of claim 4 wherein said dry cementious matrix material is in contact with the composite material.

6. The structure of claim 4 wherein said dry cementious matrix is magnesium oxy-chloride cement.

7. The structure of claim 4 wherein said sheet material is polyester mesh.

8. The structure of claim 4 wherein said water impervious material is latex rubber modified asphalt emulsion.

9. The structure of claim 1 wherein said composite further comprises a thickener.

10. The structure of claim 9 wherein said thickener is cellulose.

11. The structure of claim 1 wherein the particle size is between 0.1250 and 0.375 inches.

12. The structure of claim 1 wherein said dispersant is present from 0.125 to 0.75 pounds per gallon of said synthetic polymer particulate.

13. The structure of claim 1 wherein said matrix material being present from 0.3 to 0.8 pound per gallon of said particulate.

* * * * *